United States Patent [19]

Schröder

[11] 4,043,019

[45] Aug. 23, 1977

[54] METHOD AND ARRANGEMENT FOR SEPARATING THE MATERIAL FORMING ONE PART OF AN ARTICLE FROM THAT FORMING ANOTHER PART THEREOF, PARTICULARLY FOR USE WITH METAL-SYNTHETIC RESIN COMPOSITES

[75] Inventor: Helmut Schröder, Bonn-Bad Godesberg, Germany

[73] Assignee: Vereinigte Aluminium-Werke Aktiengesellschaft, Germany

[21] Appl. No.: 666,004

[22] Filed: Mar. 11, 1976

Related U.S. Application Data

[63] Continuation of Ser. No. 506,733, Sept. 17, 1974, abandoned.

[30] Foreign Application Priority Data

Sept. 19, 1973 Germany .............................. 2347108

[51] Int. Cl.² .............................................. B02C 19/12
[52] U.S. Cl. ...................................... 29/427; 241/23; 241/65
[58] Field of Search .................... 29/426, 427; 241/15, 241/18, 23, 27, 30, 65, 84.1, 170, 198 R, 198 A, 200, DIG. 2, DIG. 13, DIG. 29, DIG. 37; 51/163 R, 164; 83/16; 134/17

[56] References Cited

U.S. PATENT DOCUMENTS

| 1,636,585 | 7/1927 | Barker | 241/84.1 X |
|---|---|---|---|
| 2,879,005 | 3/1959 | Jarvis | 241/65 X |
| 2,881,571 | 4/1959 | Granata | 51/164 |
| 3,527,414 | 9/1970 | Schorsch | 241/23 |
| 3,647,149 | 3/1972 | Morita et al. | 241/65 |
| 3,718,284 | 2/1973 | Richardson | 241/23 |

Primary Examiner—Milton S. Mehr
Attorney, Agent, or Firm—Michael J. Striker

[57] ABSTRACT

An article is subjected to a treatment which causes one part thereof to become substantially more brittle than the remainder thereof. One manner of accomplishing this is to cool the article to low temperatures. Either during or subsequent to this treatment the article is subjected to an action which effects separation of the embrittled part from the remainder of the article. This may be achieved by impacting the article, by exposing the article to ultrasonic waves or, in the event that the embrittled part or the remainder of the article is composed of a ferrous substance, by exposing the article to a pulsating magnetic field. A preferred application is to composites consisting of a metal and a synthetic resin where cooling of the article embrittles the synthetic resin. One form of an arrangement for carrying out the method includes a hollow, rotatable cylinder having impacting masses such as steel balls accommodated therein. Inwardly extending projections provided inside the cylinder enable articles to be treated to be agitated as the cylinder rotates. As the cylinder rotates, the embrittled part of each article is comminuted by the impacting action of the masses interiorly of the cylinder. The cylinder is provided with perforations which permit a cooling medium such as liquid air or liquid nitrogen to be introduced into the interior of the cylinder. The perforations also permit the particles of the embrittled parts of the articles to escape and are so dimensioned that the remainders of the articles, which are unaffected by the impacting masses, are unable to escape from the interior of the cylinder. Another form of an arrangement for carrying out the method includes a pair of rollers arranged to move a band, which may be the article itself or a conveyor belt, in an endless path. A device for directing a cooling medium such as liquid air or liquid nitrogen onto the band is arranged adjacent a location of the path and downstream of this location there is provided an impacting device and an abutment member arranged on either side of the path so that the article may be impacted.

7 Claims, 2 Drawing Figures

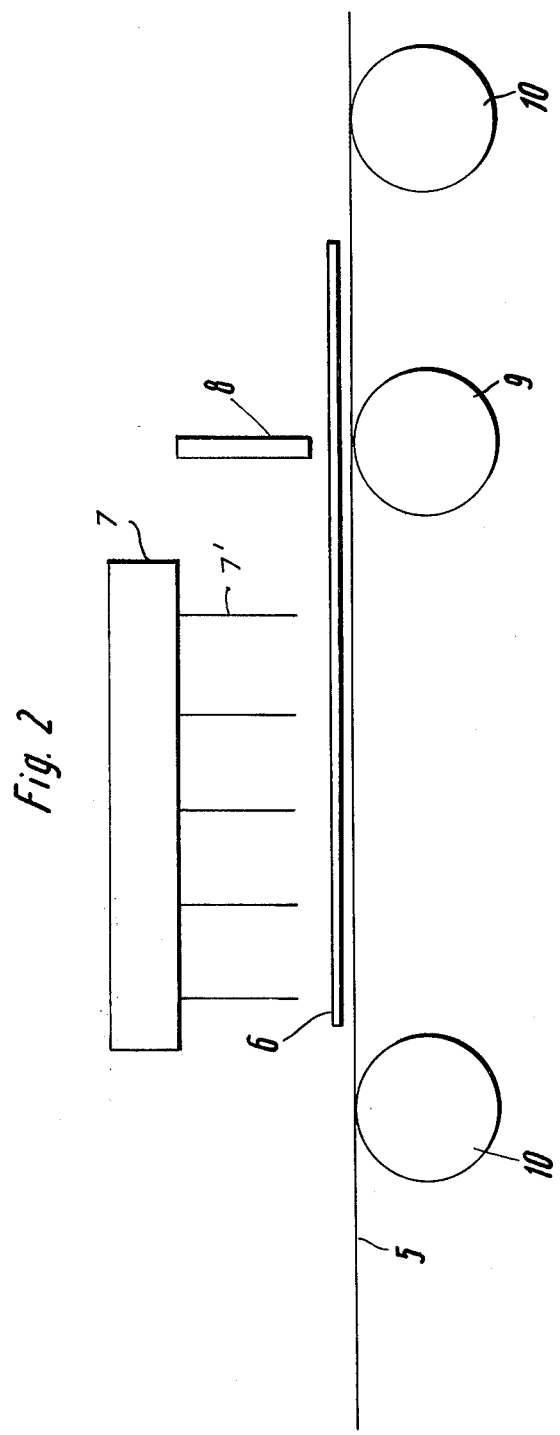

METHOD AND ARRANGEMENT FOR SEPARATING THE MATERIAL FORMING ONE PART OF AN ARTICLE FROM THAT FORMING ANOTHER PART THEREOF, PARTICULARLY FOR USE WITH METAL-SYNTHETIC RESIN COMPOSITES

CROSS-REFERENCE TO RELATED APPLICATION

This is a continuation of my copending application Ser. No. 506,733, filed Sept. 17, 1974, now abandoned.

BACKGROUND OF THE INVENTION

The invention relates generally to the treatment of articles so as to separate the material forming one part thereof from the material forming another part thereof. Of particular interest to the invention is the treatment of metal-synthetic resin composites so as to effect separation of the metal and the synthetic resin.

The problem of separating the metallic and synthetic resin components of composites made up of these substances is one which arises frequently. Examples of such composites include screw caps, which are normally provided with a bonded, relatively inaccessible interior layer of synthetic resin for sealing purposes, particularly for applications in carbonated beverage vending machines. In addition, there are many other metal-synthetic resin composite systems which are used in various phases of industry. It is often desired to recover the metallic component of such composites. Since the synthetic resin layer or coating is mostly, or at least quite often, composed of polyvinylchloride, it is not possible, on evironmental grounds, to burn the synthetic resin layer in order to recover the metal. The reason for this resides in the fact that combustion of polyvinylchloride releases chlorine compounds, which are mostly in the form of hydrogen chloride, thus leading to pollution of the environment.

Consequently, it is desirable to find some other manner of separating the metallic and synthetic resin components of composites made of these substances.

SUMMARY OF THE INVENTION

A general object of the invention is to provide a novel method and arrangement for separating the material forming one part of an article from that forming another part of the article.

Another object of the invention is to provide a method and arrangmenent which enable separation of the material forming one part of an article from the material forming another part of the article to be accomplished without pollution of the environment.

An additional object of the invention is to provide a method and arrangement which enable separation of the material forming one part of an article from that forming another part of the article to be accomplished in a straightforward manner.

A more particular object of the invention is to provide a method which differs from that outlined above and which enables synthetic resin-metal composite systems to be treated without polluting the environment.

These objects, and others which will become apparent as the description proceeds, are achieved in accordance with the invention. According to one aspect of the invention, there is provided a method of separating the material forming one part of an item from the material forming another part thereof wherein an article is treated so as to cause a first portion thereof to undergo a marked embrittlement. The article is also subjected to a treatment effecting separation of the first portion thereof from a second portion thereof.

According to another aspect of the invention, there is provided a method of separating the material forming one part of an item from the material forming another part thereof wherein an article is treated so as to cause a first portion thereof to become substantially more brittle than a second portion thereof. The article is also subjected to an action effecting separation of the first and second portions thereof.

The article may be subjected to this action either during the treating operation or subsequent thereto. The treating operation may be one where at least the portion of the article which is to become more brittle is cooled to temperatures below room temperature and such cooling may, for instance, be accomplished using a liquefied gas such as liquid nitrogen or liquid air. The action to which the article is subjected so as to effect separation of the more brittle and less brittle portions thereof may be a mechanical action such as an impacting action, an ultrasonic action in which the article is exposed to ultrasonic waves and, in the event that the more brittle or less brittle portion of the article includes a ferrous, i.e., iron-containing substance, a pulsating magnetic action in which the article is exposed to a pulsating magnetic field. A pulsating magnetic action is favorably used where the less brittle portion of the article includes a ferrous substance. In the event that the article is in the form of a composite which includes a metal part and a synthetic resin part, it is advantageous for the portion of the article which is to be more brittle to be composed of the synthetic resin and for the portion of the article which is to be less brittle to be composed of the metal. The more brittle and less brittle portions of the article may be in the form of overlying layers.

According to another aspect of the invention there is provided an arrangement for separating the material forming one part of an item from the material forming another part thereof, particularly for use with composites which include a metallic part and a synthetic resin part, which includes means for treating an article so as to cause a first portion thereof to become substantially more brittle than a second portion thereof. The arrangement further includes means for effecting separation of the first and second portions of the article.

According to one embodiment of the invention, the separating means may include a hollow, rotatable member for accommodating and agitating the article and this member is advantageously of cylindrical configuration. The rotatable member may be provided with one or more inwardly extending projections for carrying along and thereby agitating the article during rotation of the member and, in order to aid in the separation of the more brittle and less brittle portions of the article, the separating means may further comprise one or more freely movable impacting members or masses accommodated interiorly of the rotatable member for impacting the article during rotation of the rotatable member. The more brittle portion of the article may be pulverized during rotation of the rotatable member and, in order to permit escape of the particles of the more brittle portion from the rotatable member, the latter may be provided with perforations. The perforations may serve the further purpose of permitting a cooling medium, e.g., a suitable liquefied gas such as liquid nitrogen or liquid air to be introduced into the rotatable member so that the article may be cooled and embrittlement of the desired portion may occur. The less brittle portion of the article may be substantially unaffected by the impacting action which occurs during rotation of the rotatable member, that is, the less brittle portion of the article may have a certain size and may substantially maintain this size during rotation of the rotatable member. It is advantageous for the perforations provided in the rotatable member to be of dimensions smaller than the size of the less brittle portion of the article. In this manner, escape of the less brittle portion of the article from the rotatable member may be prevented.

In accordance with another embodiment of the invention, the means for effecting separation of the more brittle and less brittle portions of the article may include at least two rotatable members arranged to effect movement of an endless band in an endless path, and an impacting member or device arranged adjacent at least one location of the path. The separating means may further comprise a conveyor member mounted on the rotatable members for conveying the article along part of the path and by the impacting member. On the other hand, if the article itself is of suitable configuration, it is possible to mount the article on the rotatable members. It is favorable when an abutment member is arranged opposite the impacting member, that is, when the path extends between the impacting member and an abutment member. The means for treating the article so as to cause a first portion thereof to become more brittle than a second portion thereof may include means upstream of the impacting member for cooling at least the portion of the article which is to be more brittle. Such cooling means may, for instance, include a device for directing one or more streams of a cooling medium e.g., a suitable liquefied gas such as liquid nitrogen or liquid air, onto the article.

The novel features which are considered as characteristic of the invention are set forth in particular in the appended claims. The invention itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a schematic representation of another form of an arrangement in accordance with the invention which may be used for carrying out the method of the invention.

DESCRIPTION OF THE PREFERRED EMBODIMENTS

Figure 1:
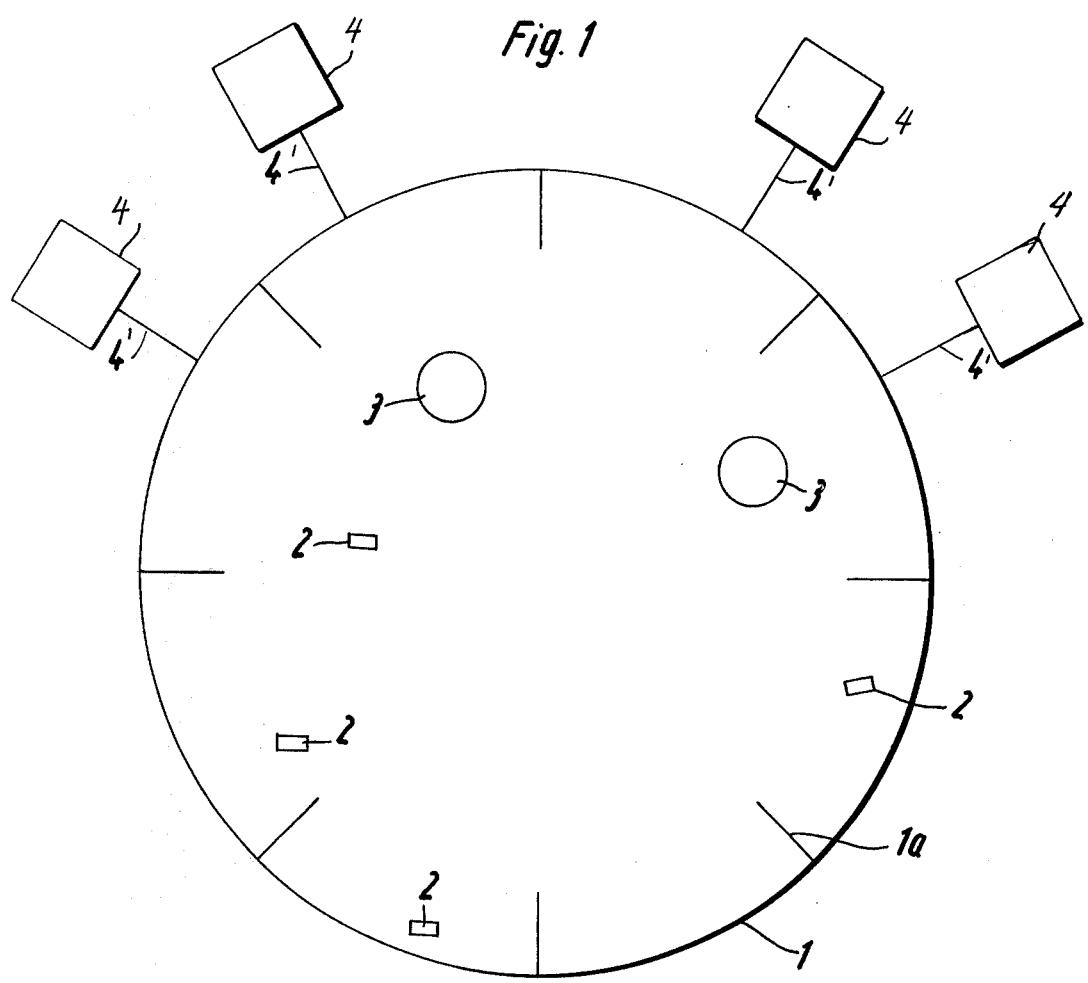
FIG. 1 is a schematic representation of one form of an arrangement according to the invention which may be used for carrying out the method of the invention.

As has already been indicated, of particular interest to the invention is the treatment of composites which include a metallic component and a synthetic resin component and, hence, the description which follows will be primarily with reference thereto.

In accordance with the invention, the metal-synthetic resin composite may be subjected to a lower temperature at which a pronounced embrittlement of the synthetic resin occurs. Naturally, the particular temperature to which the composite need be cooled will depend upon the specific synthetic resin or resins present in a given case. In addition to the cooling, the composite may either simultaneously therewith or subsequent thereto be subjected to a mechanical action or some other form of action such as, for example, ultrasonic waves or magnetic pulses in the case of iron-containing metals. In this manner, it becomes possible to effect a clean separation of the synthetic resin and the metal. The metal may thereafter undergo further processing such as melting or the like whereas the synthetic resin, which again becomes plastically deformable after reaching room temperature, may likewise be reused.

According to one embodiment of the invention, the metal-synthetic resin composite, for instance, a metallic cap screw into the interior of which there has been injected a synthetic resin, is subjected to the influence of liquid nitrogen, liquid air or the like. If the cold components of the composite are simultaneously or subsequently subjected to a mechanical action such as, for example, peening, impacting or also shearing or cutting, then the synthetic resin is fragmented into individual particles. There remains thereafter the metal as well as the synthetic resin fragments.

Referring now to FIG. 1, this illustrates one form of an arrangement which is suitable for carrying out the method of the invention. The arrangement includes a rotatable member 1 which is here shown as being of cylindrical configuration. The cylinder 1 is provided with inwardly directed projections 1a. Interiorly of the cylinder 1 there are accommodated articles 2 to be treated and the schematically illustrated articles 2 are here assumed to be in the form of metal-synthetic resin composites such as, for example, screw caps. The cylinder 1 further accommodates a plurality of heavy masses or bodies 3 interiorly thereof which may, for instance, be in the form of steel balls, and the masses 3 serve as impacting members or instruments. The projections 1a enable the composites 2 and the masses 3 to be carried along and agitated as the cylinder 1 rotates and rotation of the cylinder 1 will cause the composites 2 to be impacted by the masses 3.

The cylinder 1 is perforate, that is, is provided with perforations in the wall thereof, and may be in the form of a cylindrical wire basket, for example. The perforations in the cylinder 1 enable a cooling medium such as liquid nitrogen, liquid air or the like to be blown or sprayed into the interior of the cylinder 1. In this manner, the composites 2 may be cooled thereby causing the synthetic resin component thereof to exhibit a marked brittleness and to become substantially more brittle than the metallic component thereof. The cooling medium may be supplied from suitable sources 4 and conveyed to the cylinder 1 via conduits 4'. Of course, a single source of cooling medium may be provided instead of the several sources 4 illustrated and, similarly, it is possible to use a single nozzle or the like for introducing the cooling medium into the cylinder 1 rather than admitting the cooling medium into the latter via the plurality of conduits 4' shown.

By virtue of the cooling effect and the mechanical action obtained during rotation of the cylinder 1, the synthetic resin and metal components of the composites 2 are separated from one another. The embrittled synthetic resin component may be fragmented during the rotation by the impacting action of the masses 3 whereas the less brittle metallic component may retain the original size thereof, that is, may remain whole rather than being fragmented. The widths of the perforations provided in the cylinder 1 may be so selected that only the synthetic resin particles or fragments fall out of the cylinder 1 while the metallic parts of the composites 2 remain in the latter until it is opened.

FIG. 2 schematically illustrates another form of an arrangement according to the invention. This arrangement may be used with advantage for the treatment of articles such as synthetic resin coated sheet-like sections, for example. The arrangement includes a pair of rotatable members 10, which may be in the form of rolls, as illustrated, and which are able to convey an endless band along an endless path. A conveyor member or belt 5 is mounted for rotation on the rolls 10. An article 6 to be treated is accommodated on the belt 5 and, in the illustrated embodiment, the article 6 is conveyed from left to right by the belt 5.

A source 7 of a cooling medium such as, for instance, liquid air, is arranged above the belt 5 and a plurality of conduits 7' extend downwardly from the source 7. Thus, as the belt 5 conveys the article 6, which may, for example, be in the form of a synthetic resin coated metal plate or a synthetic resin coated coil, beneath the conduits 7', the article 6 may be subjected to the influence of the cooling medium. In this manner, the article 6 may be cooled thereby causing a pronounced embrittlement of the synthetic resin component thereof and causing the latter to become substantially more brittle than the metallic component of the article 6. It will be appreciated that a plurality of sources of cooling medium could be provided instead of the single source 7 shown and that, likewise, it is possible to have a single nozzle or the like for directing the cooling medium onto the article 6 rather than the plurality of conduits 7' illustrated.

Downstream of the source 7 of cooling medium there is arranged an impacting member or device 8 which subjects the article 6 to an impacting or hammering action as the latter is conveyed beneath the device 8 by the belt 5. An abutment member 9, here shown as being in the form of a roll, is arranged opposite the device 8. The belt 5 and the article 6 pass between the impacting device 8 and the abutment member 9 and the latter enables a positive impacting action to be imparted to the article 6 by the device 8. The impacting action to which the article 6 is subjected effects a separation of the more brittle synthetic resin component and metallic component thereof.

Although the article 6 has been illustrated as being of sheet-like form, it is also possible to treat other forms of articles such as, for instance, wires and wire networks, in a similar manner. Furthermore, if the article to be treated is of suitable configuration, it is possible to eliminate the belt 5. For example, if the article to be treated is in the form of a synthetic resin coated metal band, it is possible to mount the article directly on the rolls 10 for rotation thereby eliminating the need for the belt 5.

It will be understood that each of the elements described above, or two or more together, may also find a useful application in other types of methods and arrangements differing from the types described above.

While the invention has been illustrated and described as embodied in a method and arrangement for separating the metallic and synthetic resin components of metal-synthetic resin composites, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of preparing a metallo-plastic bottle cap for recycling by separating the plastic component which is confined in the recessed interior of the metallic cap component, comprising the steps of confining a plurality of said caps in a perforated drum having an inner circumferential surface provided with projections, together with a plurality of impacting members; cooling said caps so as to cause said plastic component to become substantially more brittle than said metallic component; and rotating said drum so that said projections entrain and agitate said caps and said impacting members to cause the latter to impact said caps and to thereby break up the brittle plastic components without breaking up the metallic components, so that the plastic components can fall out of the recessed interior of said metallic components and be removed, leaving the metallic components free of the plastic components and ready to be recycled without contamination by the plastic components.

2. A method as defined in claim 1, wherein the cooling and rotating steps are performed substantially simultaneously.

3. A method as defined in claim 1, wherein the rotating step is performed subsequent to the cooling step.

4. A method as defined in claim 1, wherein said metallic component comprises aluminum.

5. A method as defined in claim 1, wherein said bottle cap is an aluminum screw cap and said plastic component is a layer of polyvinylchloride.

6. An arrangement for preparing a metallo-plastic bottle cap for recycling by separating the metallic cap component from the plastic lining component which is recessed into the interior thereof, comprising a perforate drum mounted for rotation about its longitudinal axis and having an inner circumferential surface provided with projections; a plurality of impacting members freely movably accommodated in the interior of said drum; means for cooling a plurality of bottle caps lodged in said interior so as to render the plastic components of said caps substantially more brittle than the metallic components thereof; and means for rotating said drum so that said projections entrain and agitate said caps and said impacting members to cause the latter to impact said caps and to thereby break up the brittle plastic components without breaking up the metallic components, so that the plastic components can fall out of the recessed interior of said metallic components and be removed, leaving the metallic components free of the plastic components and ready to be recycled without contamination by the plastic components.

7. An arrangement as defined in claim 6, said plastic components being pulverized during movement of said drum and escaping through the perforations of said drum, and a cooling medium being introduced into said drum through said perforations so as to cool said bottle caps and embrittle said plastic components thereof.

* * * * *